United States Patent [19]

Hansson et al.

[11] Patent Number: 5,296,996
[45] Date of Patent: Mar. 22, 1994

[54] DEVICE FOR MOTOR AND SHORT-CIRCUIT PROTECTION

[75] Inventors: Tomas Hansson, Enköping; Per-Olof Karlström, Västeras, both of Sweden

[73] Assignee: Asea Brown Boveri AB, Västeras, Sweden

[21] Appl. No.: 854,623

[22] PCT Filed: Feb. 4, 1991

[86] PCT No.: PCT/SE91/00076
§ 371 Date: Jun. 26, 1992
§ 102(e) Date: Jun. 26, 1992

[87] PCT Pub. No.: WO91/12643
PCT Pub. Date: Aug. 22, 1991

[30] Foreign Application Priority Data

Feb. 8, 1990 [SE] Sweden .................... 9000453-2

[51] Int. Cl.$^5$ ............................ H02H 3/093
[52] U.S. Cl. .......................... 361/24; 361/31; 361/106
[58] Field of Search ............ 361/24, 106, 124

[56] References Cited

U.S. PATENT DOCUMENTS 4,642,136  2/1987  Fukushima et al. .
4,811,017  3/1989  Gulczynski .................... 341/145

FOREIGN PATENT DOCUMENTS 0087884  9/1983  European Pat. Off. .
0363746  4/1990  European Pat. Off. .
1570138  6/1980  United Kingdom .

OTHER PUBLICATIONS

Bernard M. Gordon, "Linear Electronic Analog/Digital Conversion Architectures, Their Origins, Parameters, Limitations, and Applications," *IEEE Transactions on Circuits and Systems*, vol. CAS-25, No. 7, Jul. 1978.
James S. Urquhart, et al. "A 12 Bit Monolithic 70 ns DAC," *IEEE Journal of Solid-State Circuits*, vol. 9C-18, Jun. 1983.
Jimmy R. Naylor, "A Complete High-Speed Voltage Output 16-Bit Bit Monolithic DAC," *IEEE Journal of Solid State Circuits*, vol. 9C-18, No. 6, Dec. 1983.

*Primary Examiner*—Sally Medley
*Attorney, Agent, or Firm*—Watson, Cole Grindle & Watson

[57] ABSTRACT

A device for motor and short-circuit protection in low-voltage plants includes a contact device (3) which is connected in series with a tripping circuit comprising two parallel-connected current branches. One of the branches comprises a first thermistor (1) serving as an overload protective means and connected in series with a second thermistor (2) serving as a short-circuit protective means. The second branch comprises a multi-turn excitation coil (4) which is adapted to influence the contact device (3) for opening thereof at an overcurrent. The resistivity of the two thermistors (1, 2) has a positive temperature coefficient in the temperature range in question. The first thermistor (1) may consist of a ceramic material or electrically conductive polymer composite. The second thermistor (2) consists of polymer composite with a extremely high content of electrically conductive filler and is, in addition, layered. This results in the thermistor very rapidly changing from a low-resistance state to a high-resistance state at a high current rate of change.

11 Claims, 4 Drawing Sheets

DEVICE FOR MOTOR AND SHORT-CIRCUIT PROTECTION

TECHNICAL FIELD

The present invention relates to a device for motor and short-circuit protection in electric plants. The protection device comprises a contact device and a tripping circuit arranged in series with the contact device and comprising two parallel-connected current branches. One of the branches comprises a thermistor which serves as an overload protective means and the resistivity of which has a positive temperature coefficient. The other branch comprises an excitation coil, which is adapted to influence the contact device for opening thereof at an overcurrent. The protection device is primarily intended for use in low-voltage plants, by which is meant here plants with a maximum operating voltage of 1000 V.

BACKGROUND ART

Protection devices of the above kind, which include thermistors of a ceramic type, are previously known from patent publication GB-A-1570138. Ceramic thermistors may be $BaTiO_3$-based or $V_2O_3$-based. Such thermistors are described in, for example, U.S. Pat. No. 4,642,136 and in the article "A New PTC Resistor for Power Applications", by R S Perkins et al, published in the journal IEEE Transactions on Components, Hybrides and Manufacturing Technology, Vol. CHMT-5, No. 2, June 1982, pp. 225–230. A disadvantage with ceramic thermistors is that they exhibit negative temperature coefficient when the temperature exceeds a certain value. In addition, a ceramic thermistor has a tendency to crack when traversed by a short-circuit current because of the thermal and mechanical stresses to which it is subjected when it changes to its high-resistance state. Also, it is relatively expensive.

Another type of thermistors intended for overcurrent protection are known from, inter alia, patent publications EP-A-0038716 and EP-A-0087884. Thermistors of this type are built up from a polymer material, for example high-pressure polyethylene, containing particles of an electrically conductive material, for example carbon black. Alternatively, the electrically conductive filler may consist of $V_2O_3$ material dispersed as described in the article "$V_2O_3$ Composite Thermistors" by D Moffatt et al, published in Proceedings of the Sixth IEEE International Symposium on Applications of Ferroelectrics, 1986, pp. 673–676. A polymer-based thermistor of the above-mentioned kind has several advantages compared with a ceramic one. For example, its resistance in the temperature range in question is monotonously increasing with the temperature and the resistance increase is considerably greater. In addition, it is considerably cheaper. However, commercially available thermistors of this type are designed for relatively low rated voltages, for example 50–100 V, and cannot therefore be readily used in distribution networks.

In EP-A-0363746 a device for overcurrent protection is described, which includes a polymer-based thermistor of the above kind. This device is designed so as to function both as a motor and a short-circuit protective means and it may be used in networks with an operating voltage of, for example, 230 V in which voltage peaks of the order of magnitude of 400–500 V may occur, for example in case of short-circuit breaking. The maximum presumptive short-circuit current which may be broken with this device is, however, limited, as is the possibility of adapting the tripping characteristic of the device to the equipment to be protected.

SUMMARY OF THE INVENTION

The present invention aims to provide a relatively simple and inexpensive protective device of the abovementioned kind, which is capable of breaking the highest short-circuit currents occurring in low-voltage networks and the tripping characteristic of which can be easily adapted to the object which is to be protected. This is achieved according to the invention by a device with the characteristic features described in claim 1.

The first thermistor serving as an overload protective means may consist of a ceramic material or an electrically conductive polymer composite. The second thermistor serving as a short-circuit protective means consists of a polymer composite with an extremely high content of electrically conductive filler and, in addition, it is preferably layered. In this connection the term "layered" means that the thermistor comprises at least one body of conducting polymer provided with two parallel or concentric surfaces, at least one of these surfaces being in contact with an electrode or with a parallel or concentric surface of another body of conducting polymer.

By arranging, in series with the thermistor serving as an overload protective means (motor protector) in one of the current branches of the tripping circuit, a short-circuit protective means in the form of the specially designed second thermistor, the following advantages, inter alia, are obtained:

a) A considerably higher breaking capacity because of the special second thermistor. Possibilities are provided for current-limiting breaking of prospective short-circuit currents in the network of up to 100 kA and possibly higher.

b) There are no coordination problems between the two thermistors since the second thermistor cannot trip (i.e. switch from a low-resistance to a high-resistance state) within the operating range of the first thermistor.

c) The first thermistor can be made very low-ohmic (by making it thin) since it is not subjected to high voltages in tripped condition.

d) By using two series-connected, physically separated elements for overload protection and short-circuit protection, respectively, increased reliability in case of a short circuit is obtained.

e) It is possible to use a very simple contact device which possibly need not be provided with arc chutes.

BRIEF DESCRIPTION OF THE DRAWINGS

The invention will be explained in greater detail by means of examples with reference to the accompanying drawings, wherein.

DESCRIPTION OF THE PREFERRED EMBODIMENTS

Figure 1:
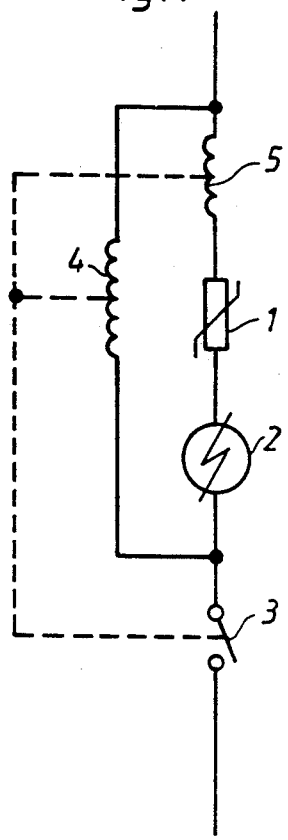
FIG. 1 shows a circuit diagram for a protective device according to the invention.

The device for motor and short-circuit protection shown in FIG. 1 comprises a contact device 3 and a tripping circuit connected in series with the contact device, the tripping circuit being adapted to influence the contact device for automatic opening thereof at an overcurrent. The tripping circuit comprises two parallel-connected current branches. One of the current branches consists of three series-connected elements, namely a first thermistor 1, a second thermistor 2, and an excitation coil 5 with few turns, whereas the other current branch comprises a multi-turn excitation coil 4.

The first thermistor 1, which is of the above-mentioned polymer-based type, the resistivity of which has a positive temperature coefficient, is referred to in the following as the "PTC thermistor" (PTC=Positive Temperature Coefficient). In the normal operating range of this thermistor, which may extend up to, for example, 80° C., the resistance of the thermistor is low, for example 0.01 Ω, and increases slightly with the temperature. If the temperature of the thermistor exceeds this value, for example because of overcurrent, the resistance increases more rapidly and when exceeding a certain temperature, which, for example, may be around 120° C., the thermistor suddenly switches from a low-resistance to a high-resistance state, in which the resistance may amount to 1 kΩ and more. The PTC thermistor is thermally delayed, which has been achieved, for example, by a design as described in the above-mentioned EP-A-0363746.

Figure 3:
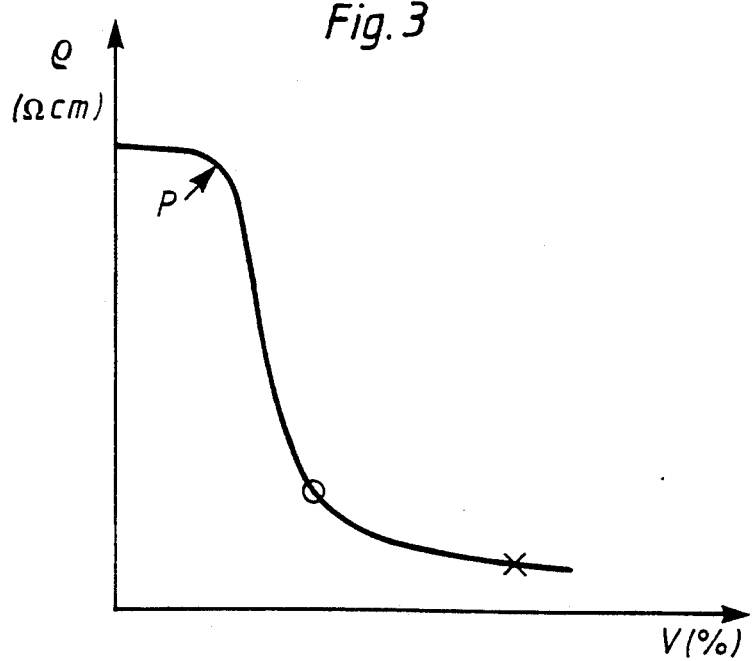
FIG. 3 shows a percolation curve for such a thermistor.

Also the second thermistor 2 is made of electrically conductive polymer composite with a positive temperature coefficient. However, it differs from the first thermistor, among other things by having a considerably higher percentage by volume of electrically conductive filler. This is clear from FIG. 3, which schematically shows a percolation curve for a polymer composite, i.e. the resistivity of the material in cold state as a function of the percentage by volume v of electrically conductive filler (carbon black, graphite, etc.) For a conventional polymer-based thermistor, such as the above first thermistor 1, the working point lies at the point marked o on the curve, whereas the working point for the above second thermistor lies at the point x, relatively far away from the so-called percolation threshold P, i.e. the point on the percolation curve where the resistivity of the composite starts decreasing. Because of the low cold resistance of the second thermistor, its loss power is low and the thermistor may be designed for a high rated current per unit of volume. Another feature of the second thermistor is that it is layered, i.e. composed of at least two parts which make contact with each other along a boundary substantially parallel to the end surfaces of the thermistor. The parts may be joined together along the boundary and/or be pressed against each other with the aid of a pressure device. The special design of the second thermistor means that it is sensitive to a high rate of change of the current (di/dt) and supplied energy. At moderate short-circuit currents, for example less than 15-20 times the rated current, this thermistor remains in its low-resistance state whereas, on the other hand, when the current density exceeds a certain value, a very fast change to the high-resistance state takes place. This thermistor is referred to in the following as a "CLI element" (CLI=Current Limiting Interface).

The two excitation coils 4 and 5 are part of an electromagnetic tripping device which directly or indirectly, via a mechanism, influences the contact device 3 for opening thereof at an overcurrent. The coil 5 in the first current branch has few turns and is low-ohmic and it is dimensioned to activate the tripping device for currents exceeding 3-15 times the rated current of the protective device, also when the PTC element 1 and/or the CLI element 2 has not tripped.

The coil 4 in the second branch is a multi-turn and high-ohmic coil and it may suitably be wound on the same core as the second coil 5. The coils are wound and connected in such a way that their magnetic fluxes cooperate.

Figure 2:
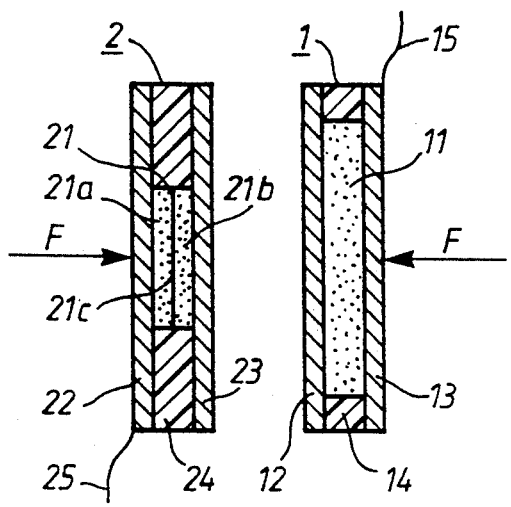
FIG. 2 shows a central section through two different polymer-based thermistors included in the protective device according to FIG. 1.

FIG. 2 shows a cross-section through a PTC thermistor 1 and a CLI element 2 of the type included in a device according to the present invention. The PTC thermistor 1 comprises a centrally arranged body 11 of an electrically conductive polymer composite (e.g. consisting of 67 per cent by volume polyethylene and 33 per cent by volume carbon black) in the form of a rectangular plate and two electrodes 12 and 13 arranged at the end surfaces of the body (the flat sides of the plate). Around the periphery of the body 11, between electrodes 12, 13, a collar 14 of insulating material is provided.

Also the CLI element 2 comprises a centrally arranged plate-formed body 21 of electrically conductive polymer composite with end electrodes 22, 23 and insulating collar 24. In this case, however, the body 21 consists of two equally large parts 21a and 21b, which make contact with each other (or are fused) along a boundary 21c parallel to the flat sides of the body. The body 21 consists of a polymer composite which contains a considerably larger percentage by volume of electrically conductive filler (e.g. carbon black) than the polymer composite body 11 of the PTC thermistor.

The PTC thermistor 1 and the CLI element 2 are pressed against each other with a force acting in the direction of the arrows F, which force may be achieved purely mechanically and/or by utilizing forces generated by electric current. The external electrodes 13, 22 in the united thermistor device 1, 2 are provided with connecting members 15 and 25, respectively.

Figure 4:
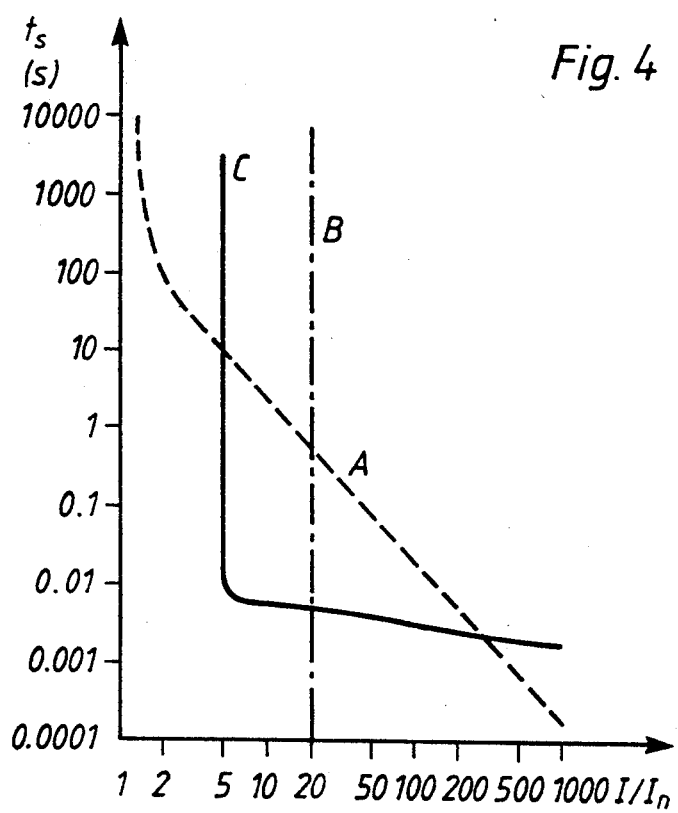
FIG. 4 shows curves of the tripping time as a function of the current for different elements included in the protective device according to FIG. 1.
Figure 5:
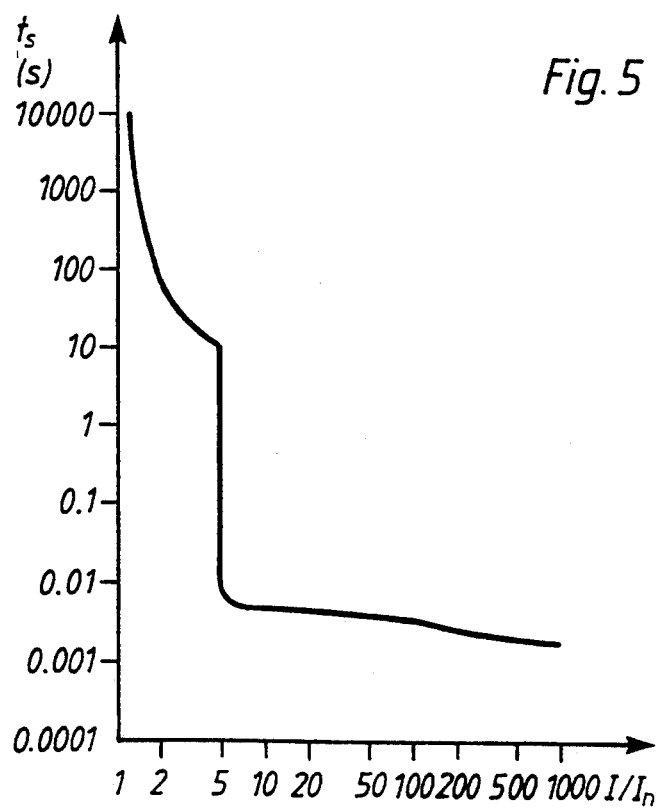
FIG. 5 shows a curve of the resultant tripping time as a function of the current for the protective device according to FIG. 1.

FIG. 4 shows the tripping characteristic for different elements in the protective device according to FIG. 1, and FIG. 5 shows the resultant tripping characteristic, specific to the protective device, i.e. the tripping time t as a function of the ratio between the overcurrent I and the rated current $I_n$ of the protective device.

The characteristic of the PTC thermistor 1 is represented by the curve A in FIG. 4, the CLI element 2 is represented by the curve B and the coil 5 by the curve C. The characteristic of the coil 4 is not shown in FIG. 4 since this coil is activated at currents lower than $I_n$.

By a suitable choice and correlation between the PTC thermistor 1, the CLI element 2 and the coils 4 and 5, the tripping characteristic of the protective device can be made to correspond to any one of the standardized tripping characteristics which are prescribed in current standards, for example VDE 0641 and CEE publication 19.

From curve A in FIG. 4 it is clear that the PTC thermistor 1 provides a thermal delay of the tripping, which is a condition for using the device for motor protection. The steepest part of the curve is determined by the current value at which the coil 5 is activated, whereupon the circuit is broken up by the contact device 3. The more or less horizontal part of the curve C (below 0.01 s) is determined by the mechanism of the contact device (mechanical time delay).

The curve B for the CLI element 2 is very steep for currents higher than about 20 times the rated current $I_n$. These currents are therefore limited very rapidly by the CLI element and are commutated over to the high-ohmic second current branch where they are limited further, after which the multi-turn excitation coil 4 influences the mechanism for the contact device 3, which breaks up the circuit.

In the current interval between the steep part of the curve C and the curve B for the CLI element, the break time is determined only by the excitation coil 5 with few turns and by the breaker mechanism. Neither the PTC thermistor nor the CLI element is activated in this current interval.

In a practical embodiment according to FIG. 1, in which the contact device 3 consisted of a circuit breaker with the rated current $I_n = 16$ A, a PTC thermistor 1 and a CLI element 2 were included, both of them in the form of a thin plate, with the following data:

|  | PTC thermistor | CLI element |
| --- | --- | --- |
| Cross section area (cm$^2$) | 7.3 | 7 |
| Thickness in the current direction (cm) | 0.1 | 0.1 |
| Resistance ($\Omega$) at 25° C. | 0.004 | 0.002 |
| Resistance ($\Omega$) at 125° C. | >10 | <0.01 |
| Heat capacity (Ws/°C.) | 0.7 | 0.8 |

The two excitation coils 4 and 5 consisted of solenoids which were wound on the same core and arranged in such a way that their magnetic fluxes cooperated. The coil 5 was made with 6 turns and had a resistance of 2 m$\Omega$, whereas the coil 4 was made with 90 turns and had a resistance of 300 m$\Omega$. The electromagnetic tripping device which was formed from the coils 4 and 5 with the associated magnetic circuit was dimensioned to be activated at 540 ampere turns.

Figure 6:
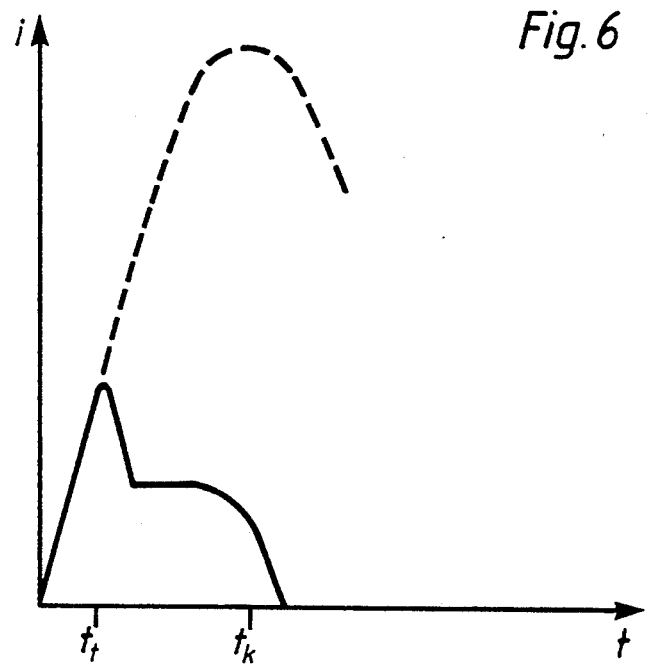
FIG. 6 shows the variation of the current for a short-circuit breaking with a protective device according to FIG. 1, and FIGS. 7, 8 and 9 show circuit diagrams for additional variants of the protective device according to the invention.

FIG. 6 shows the variation of the current for a short-circuit breaking with a protective device according to FIG. 1, which, by a suitable choice of the circuit elements included, exhibits the tripping characteristic shown in FIG. 5. During normal operation, both the PTC thermistor 1 and the CLI element 2 have low resistance, for example lower than 0.02 $\Omega$ altogether, and the entire operating current flows through the first current branch. If a short circuit occurs, and the presumptive short-circuit current of the network exceeds 20 times the rated current of the protective device, the current rises very rapidly an at the time $t_i$, which is only a few parts of a millisecond after the occurrence of the short circuit, the CLI element 2 changes from its low-resistance to its high-resistance state. This causes the current to be commutated over to the second current branch, where it is limited by the impedance in the coil 4, which has a relatively high resistance, for example 0.3 $\Omega$. The coil 4 directly influences the contact and the mechanism for the contact device 3, thus obtaining a rapid opening thereof at the time $t_k$, the current thus being broken. Since the current has been limited to a relative low value because of the impedance in the coil 4 and, in addition, is substantially resistive, the breaking is relatively simple. The contact device can therefore be very simple and possibly need not be provided with arc chutes. In addition, by the rapid contact opening a rapid voltage relief of the thermistors 1 and 2 is obtained, and these thermistors therefore need not be designed to continuously withstand the operating voltage.

Figure 7:
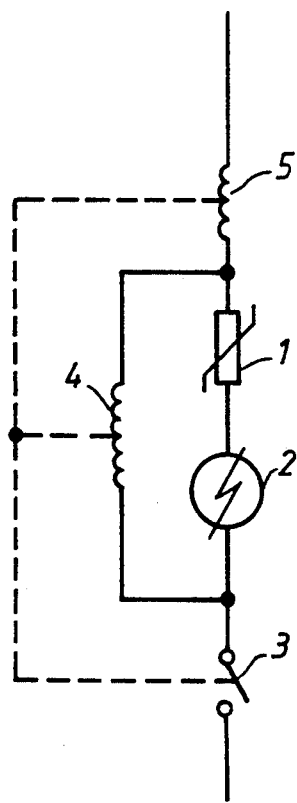
Figure 8:
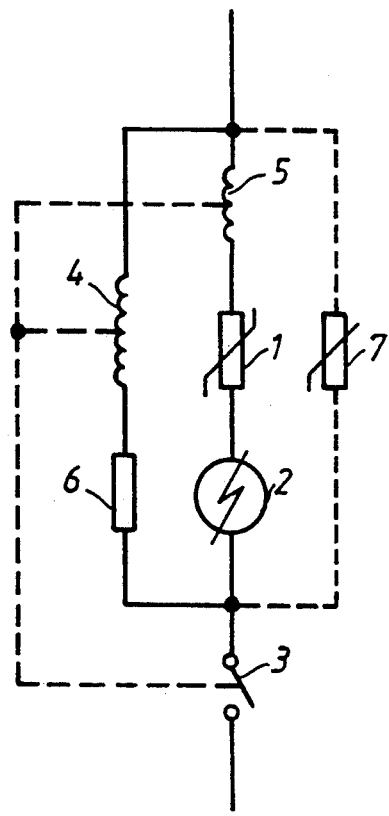

FIGS. 7 and 8 show further variants of a protective device according to the invention, which comprise the elements of the device according to FIG. 1.

The device according to FIG. 7 differs from that shown in FIG. 1 in that the coil 5 with few turns is not included in the first current branch but is connected in series with the two parallel-connected branches.

FIG. 8 shows a variant in which a series resistor 6 has been introduced in the second current branch to further increase the resistance in this branch, thus obtaining an even stronger current limitation. The series resistor may be a pure resistor, a PTC resistor, or a varistor.

The connections according to FIGS. 1 and 7 may be further increased with elements for overvoltage protection, for example in the form of a varistor 7, connected as is clear from FIG. 8.

Figure 9:
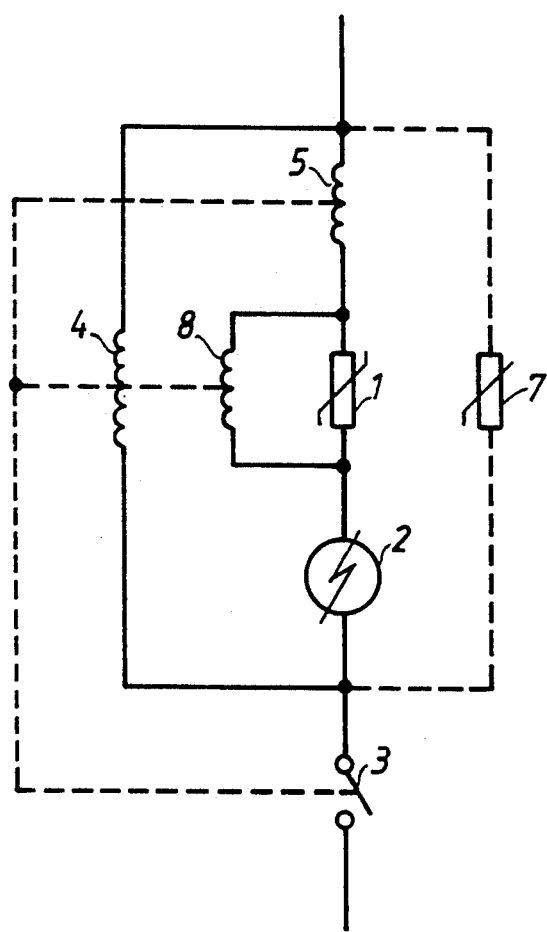

FIG. 9 shows an embodiment in which the first thermistor 1 serving as overload protective means is made of ceramic material, for example $V_2O_3$. Because of the CLI element 2, the ceramic thermistor 1 will trip only for moderate overcurrents, thus eliminating drawbacks such as crack formation etc. A $V_2O_3$-based thermistor increases its resistance approximately 300 times when tripping, i.e. a considerably smaller resistance increase than in the other thermistor types mentioned. The thermistor 1 is therefore connected in parallel with a third excitation coil 8, which is relatively low-ohmic in order to obtain coordination with the thermistor 1.

The invention is not limited to the embodiments shown but several modifications are feasible within the scope of the claims. For example, the polymer composite body 21 of the CLI element shown in FIG. 2 need not be divided, but may instead consist of a plate in one single piece. Also in such an embodiment, as in a layer-type thermistor, a resistance concentration to definite zones is obtained, namely in this case to the boundaries between the composite body 21 and the metallic end electrodes 22, 23.

The two thermistors 1 and 2 may, of course, consist of two completely separate bodies and need not be pressed against each other as shown in FIG. 2. Besides, in an assembly according to FIG. 2, one of the centre electrodes 12, 23 may be omitted.

The excitation coil 4 may alternatively consist of two inductively coupled, series-connected sub-coils traversed by anti-parallel currents, as described in the above-mentioned Swedish patent application 88003644-7. In this embodiment, one of the sub-coils is fixed and the other movable, the movable sub coil being adapted to achieve opening of the contact device via an actuating member.

The PTC thermistor 1 included in the connections shown is not absolutely necessary but may be omitted if it is desired to implement the thermal delay in some other way, for example with an electronic overload relay. However, in most cases this entails a more complicated solution.

We claim:

1. Device for overload and short-circuit protection, comprising:

a contact device and an electric tripping circuit connected in series with the contact device;

said tripping device comprising two current branches connected in parallel, a first current branch comprising a first thermistor providing overload protection with thermal delay, said first thermistor having a positive temperature coefficient of resistivity;

a second current branch comprising an excitation coil operatively connected to the contact device for opening thereof during an overcurrent condition;

said first current branch further comprising a second thermistor connected in series with said first thermistor and providing short-circuit protection, said second thermistor having a positive temperature coefficient of resistivity and being made of electrically conductive polymer composite to change to a high resistance state only if the short-circuit current amounts to substantially at least 15 times the rated current of the device.

2. A device according to claim 1, wherein said second thermistor is made of electrically conductive polymer composite having a content of electrically conductive filler considerably higher than a content of electrically conductive filler in the first thermistor wherein the resistivity of the second thermistor is lower than the resistivity of the first thermistor at a working point on the percolation curve.

3. A device according to claim 1, wherein said second thermistor comprises a plate-formed body defining two parallel end surfaces, said body being composed of at least two parts joined together along a boundary parallel to said end surfaces.

4. A device according to claim 1, further comprising a second excitation coil connected in series with said two thermistors in said first current branch and is operatively connected to the contact device for opening thereof with an overcurrent condition of the device.

5. A device according to claim 4, wherein said two excitation coils are wound on the one and the same core so that the magnetic fluxes of the coils are magnetically linked.

6. A device according to claim 4, wherein said first thermistor is made of ceramic material and is directly connected in parallel to a third excitation coil having a low ohmic resistance relative to said first excitation coil.

7. A device according to claim 4, wherein said second excitation coil has low ohmic resistance relative to said first excitation coil.

8. A device according to claim 7, wherein said two excitation coils are wound on the one and the same core so that the magnetic fluxes of the coils are magnetically linked.

9. A device according to claim 1, further comprising a second excitation coil connected in series with said two current branches and operatively connected to said contact device for opening thereof with an overcurrent condition of the device.

10. A device according to claim 9, wherein said second excitation coil has low ohmic resistance relative to said first excitation coil.

11. A device according to claim 9, wherein said two excitation coils are wound on the one and the same core so that the magnetic fluxes of the coils are magnetically linked.

* * * * *